US010647383B2

(12) United States Patent
Civiero et al.

(10) Patent No.: US 10,647,383 B2
(45) Date of Patent: May 12, 2020

(54) TOOTHED WHEEL ASSEMBLY FOR SPROCKET ASSEMBLY

(71) Applicant: Campagnolo S.r.l., Vicenza (IT)

(72) Inventors: Micro Civiero, Montecchia di Crosara (IT); Filippo Bisarello, Costabissara (IT)

(73) Assignee: Campagnolo S.r.l., Vicenza (IT)

( * ) Notice: Subject to any disclaimer, the term of this patent is extended or adjusted under 35 U.S.C. 154(b) by 108 days.

(21) Appl. No.: 15/894,326

(22) Filed: Feb. 12, 2018

(65) Prior Publication Data
US 2018/0229802 A1 Aug. 16, 2018

(30) Foreign Application Priority Data

Feb. 13, 2017 (IT) .......................... 102017000015311

(51) Int. Cl.
*B62M 9/12* (2006.01)
*F16H 55/30* (2006.01)
*B62M 9/10* (2006.01)

(52) U.S. Cl.
CPC ................ *B62M 9/12* (2013.01); *B62M 9/10* (2013.01); *B62M 9/105* (2013.01); *F16H 55/30* (2013.01)

(58) Field of Classification Search
CPC .......... B62M 9/12; B62M 9/10; B62M 9/105; F16H 55/30
USPC ....................................................... 474/160
See application file for complete search history.

(56) References Cited

U.S. PATENT DOCUMENTS

| 4,380,445 | A | 4/1983 | Shimano |
| 4,642,075 | A * | 2/1987 | Nagashima ............. F16H 55/30 474/158 |
| 8,360,911 | B2 | 1/2013 | Braedt |
| 9,260,158 | B2 | 2/2016 | Braedt |
| 9,868,491 | B1 * | 1/2018 | Oishi ........................ B62M 9/10 |
| 2005/0272546 | A1 * | 12/2005 | Reiter ..................... B62M 9/10 474/152 |

(Continued)

FOREIGN PATENT DOCUMENTS

DE 102007010456 A1 12/2007
EP 1972540 A2 9/2008

OTHER PUBLICATIONS

Italian Search Report and Written Opinion in Italian Application No. 102017000015311, dated Nov. 6, 2017, with English translation.

*Primary Examiner* — Michael R Mansen
*Assistant Examiner* — Raveen J Dias
(74) *Attorney, Agent, or Firm* — Volpe and Koenig, P.C.

(57) ABSTRACT

A toothed wheel assembly that has at least two toothed wheels. Each toothed wheel has a plurality of teeth separated from one another by corresponding troughs and the second toothed wheel has a greater number of teeth than the number of teeth of the first toothed wheel. A plurality of connection bodies connect the first and second toothed wheels axially and space them. Each connection body has a first connection portion that is connected to the second toothed wheel and extends radially from the second toothed wheel towards the first toothed wheel and a second connection portion connected to the first toothed wheel that extends axially from the first toothed wheel. The second connection portion of each connection body has a circumferential bulk the radial projection of which is completely contained in a trough of the first toothed wheel.

17 Claims, 5 Drawing Sheets

(56) References Cited

U.S. PATENT DOCUMENTS

| | | |
|---|---|---|
| 2008/0004143 A1 | 1/2008 | Kanehisa et al. |
| 2009/0215566 A1 | 8/2009 | Braedt |
| 2011/0319209 A1* | 12/2011 | Huang .................... B21K 1/28 |
| | | 474/164 |
| 2012/0302384 A1 | 11/2012 | Braedt |
| 2016/0144929 A1* | 5/2016 | Staples ................... B62M 9/10 |
| | | 474/160 |
| 2016/0272002 A1* | 9/2016 | Earle ................. B60B 27/0026 |
| 2018/0105229 A1* | 4/2018 | Reinbold ............... B62M 9/122 |

* cited by examiner

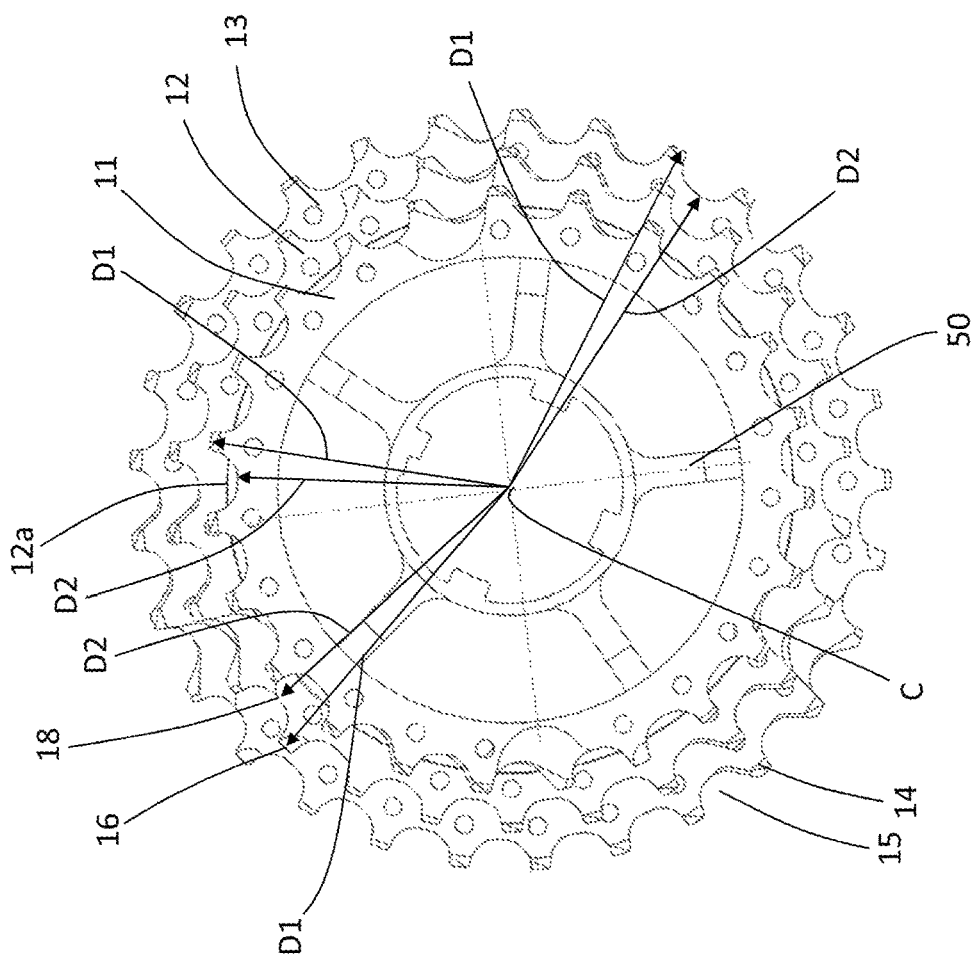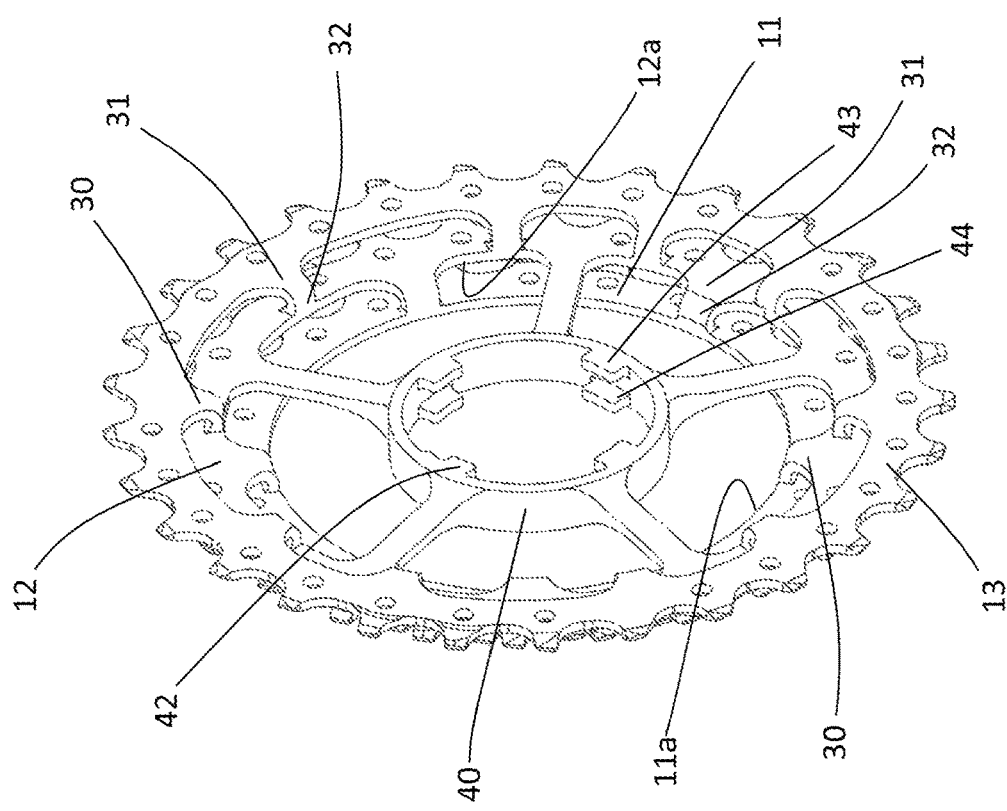

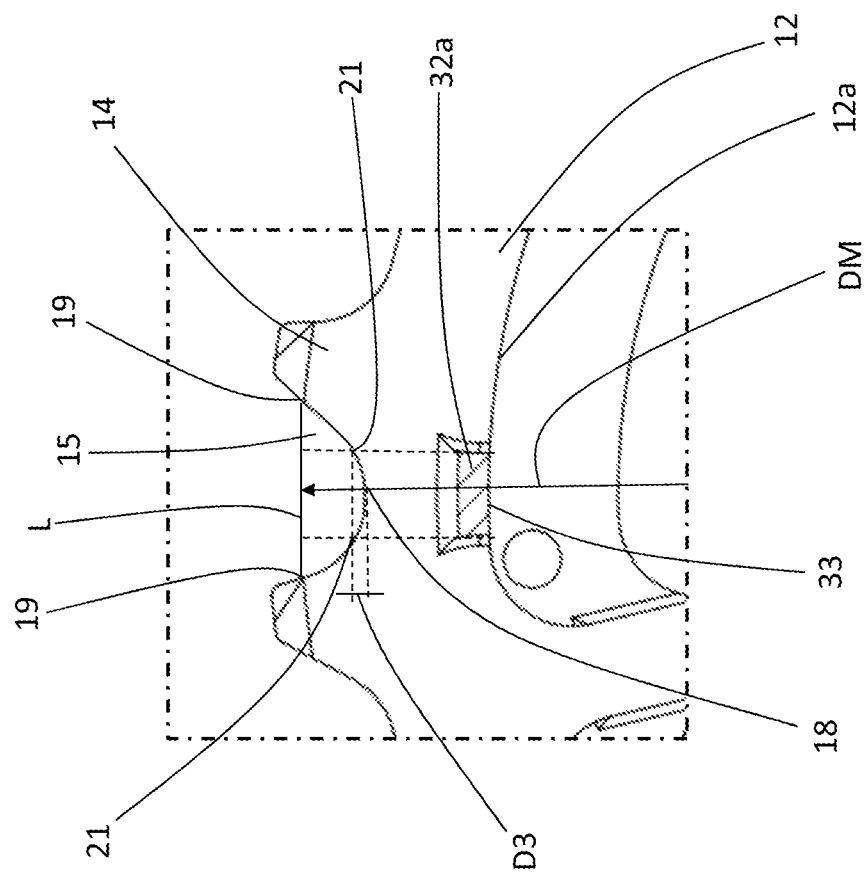
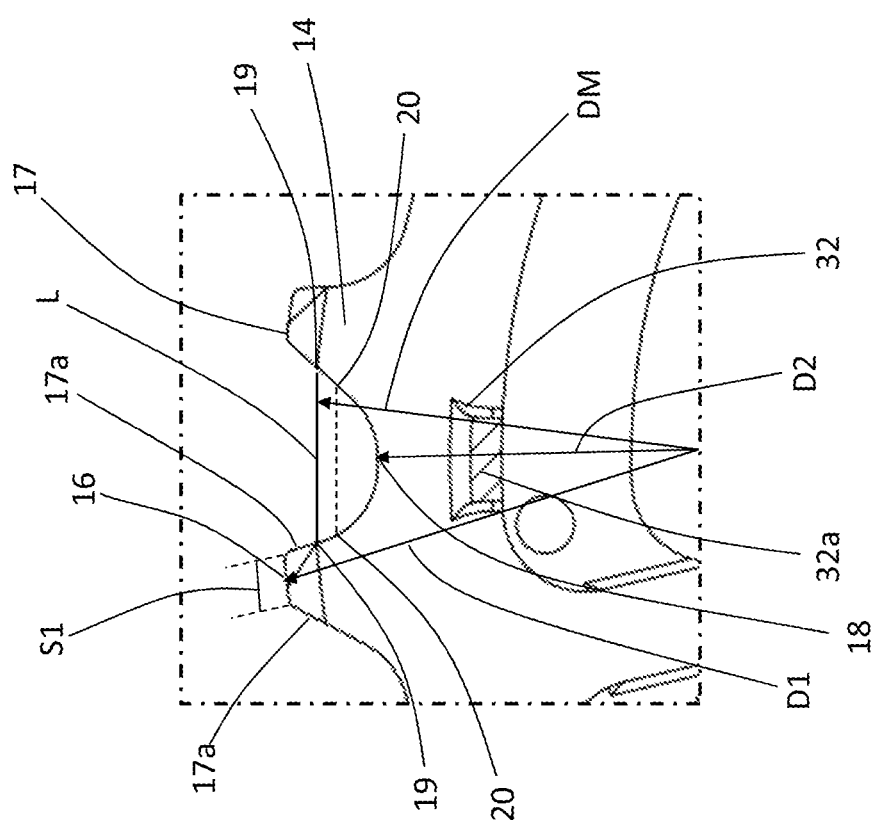

TOOTHED WHEEL ASSEMBLY FOR SPROCKET ASSEMBLY

CROSS REFERENCE TO RELATED APPLICATION(S)

This application claims the benefit of Italian Application No. 102017000015311, filed on Feb. 13, 2017, which is incorporated herein by reference as if fully set forth.

FIELD OF INVENTION

The present invention relates to a toothed wheel assembly for a bicycle sprocket assembly.

BACKGROUND

In the rest of the present description and in the following claims, the expression "toothed wheel assembly" is meant to indicate the assembly of at least two toothed wheels configured to make at least one part of the sprocket assembly for a rear wheel of a bicycle.

The toothed wheel assembly is intended to be mounted on a freewheel body of a hub of a rear wheel of a bicycle to be engaged by a transmission chain.

As known, the motion transmission system of a bicycle comprises a pair of pedal cranks, on which the cyclist exerts a propulsive thrust, one or more driving toothed wheels, set in rotation by direct coupling with the pedal cranks, and a plurality of driven toothed wheels, also called sprockets, of different sizes, set in rotation by the driving toothed wheels through a chain.

The sprockets are coupled with the rear wheel of the bicycle through a hub. This comprises a first body rigidly connected to the rim of the bicycle through spokes, and a second body rigidly coupled with the sprockets and capable of rotating free with respect to the first body in one direction of rotation, and of setting it in in rotation in the opposite direction, thus causing the advancing movement of the rear drive wheel. In the technical jargon, this second body is called "freewheel body". The totality of the sprockets, or toothed wheels, mounted on the freewheel body is commonly called a "sprocket assembly".

The chain consists of a succession of links, each normally consisting of a pair of plates facing one another and spaced apart to define an insertion space of a tooth of a toothed wheel. The plates of a link are rotatably coupled with the plates of the next link through a rivet, which is in turn surrounded by a roller or bush capable of rotating freely with respect to the rivet.

The sprockets in general are made of extremely strong material (like steel or titanium) to withstand the wearing generated by the sliding of the chain and the loads to which they are subjected during operation.

The sprockets of the sprocket assembly can comprise a radially inner annular portion provided with grooves adapted for engaging the grooves of the freewheel body. In this case, the sprockets are axially spaced apart by spacers that are usually cylindrical in shape.

Alternatively, the sprockets of the sprocket assembly can be connected to one another to form a toothed wheel assembly supported by a cylindrical element having a radially inner surface provided with grooves adapted for engaging the grooves of the freewheel body.

In this last case, the sprockets connected to one another axially can be two or more, even up to the totality of the sprockets that make the sprocket assembly.

Document US 2012/0302384A1 and document US 2009/0215566A1 show respective sprocket assemblies entirely formed from sprockets axially connected to one another and connected to a support element for engaging the freewheel body.

Document U.S. Pat. No. 4,380,445 shows a toothed wheel assembly comprising two sprockets, which makes a so-called twin-set, said assembly being able to be associated with further toothed wheel assemblies to define the sprocket assembly.

In a toothed wheel assembly, the axial connection between the sprockets has the dual function of keeping the sprockets axially spaced apart and of mechanically connecting them to one another to give the necessary mechanical strength to the sprocket assembly.

Such an axial connection can be made by cylindrical portions connected to a side surface of a first sprocket and to the side surface of the adjacent sprocket directly facing the first sprocket.

However, in order to reduce the weight of the sprocket assembly, it is common practice to make openings in the cylindrical portions of the axial connection, as described for example in document US 2012/0302384A1 cited above.

In order to keep the weight of the sprocket assembly as low as possible, it is also usual to make the sprockets of the toothed wheel assembly with radial dimensions that are as small as possible. In this way, the axial connection between the sprockets is made in a radially inner portion of the sprocket immediately below the teeth of the sprocket, as shown for example in document US 2009/0215566A1.

The Applicant has noted that the toothed wheel assemblies for a sprocket assembly can cause instability of engagement of the transmission chain during use, especially when intensive, of the bicycle.

The Applicant has found that dirt, small debris and similar can slip between two sprockets and deposit on the connection portions between the sprockets.

The Applicant has noted that since such connection portions are close to the teeth of the sprocket (to reduce the weight of the sprocket assembly), the accumulation of dirt and/or small debris can be such as to reach the pair of mutually facing plates of the chain defining the insertion space of the tooth of the toothed wheel.

The Applicant has found that in such a situation the tooth of the toothed wheel could not be completely engaged by the insertion space, since the pair of plates tends to rest on the accumulation of dirt and/or small debris, actually lifting the chain with respect to the tooth.

SUMMARY

The Applicant has found that providing a toothed wheel assembly where each toothed wheel has a plurality of teeth separated from one another by corresponding troughs and the second toothed wheel has a greater number of teeth than the first toothed wheel, and connection bodies with a first connection portion connected to the second toothed wheel that extends radially from the second toothed wheel towards the first toothed wheel and a second connection portion connected to the first toothed wheel that extends axially from the first toothed wheel, so a second connection portion of each connection body has a radial projection of which is completely contained in a trough of the first toothed wheel.

The second connection portion of each connection body projects axially from a side surface of the first toothed wheel defining a sort of bracket that has the purpose of keeping the first and the second toothed wheel spaced apart.

The Applicant has found that by arranging the second connection portion so that it is within the bulk of a trough, possible dirt and/or small debris that can be deposited on the bracket defined by the second connection portion would be at a roller of the chain.

BRIEF DESCRIPTION OF THE DRAWINGS

The features and advantages of the invention will become clearer from the following description of preferred embodiments thereof, made with reference to the attached drawings. In such drawings:

FIG. 3 is a perspective view of a variant embodiment of the assembly of FIG. 1;

FIG. 4 is a front view of the assembly of FIG. 3;

FIGS. 7 and 8 are enlargements of some details of the assembly of FIG. 6;

DETAILED DESCRIPTION OF THE PREFERRED EMBODIMENTS

Figure 1:
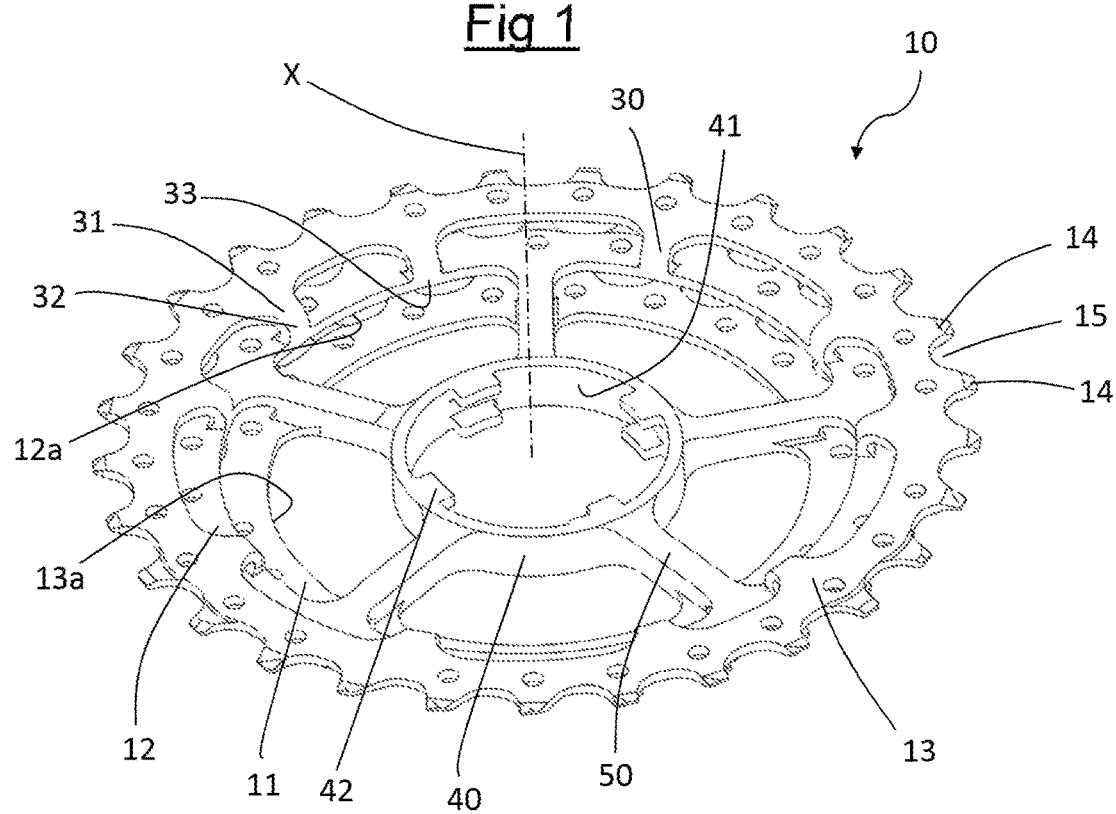
FIG. 1 is a perspective view of a toothed wheel assembly for a sprocket assembly according to the invention.

The present solution provides a toothed wheel assembly for a sprocket assembly comprising: at least one first and a second toothed wheel;

each toothed wheel comprising a plurality of teeth separated from one another by corresponding troughs and wherein the second toothed wheel has a greater number of teeth than the number of teeth of the first toothed wheel;

a plurality of connection bodies that mechanically connect the first and the second toothed wheel axially spacing them apart, each connection body comprising a first connection portion connected to the second toothed wheel that extends radially from the second toothed wheel towards the first toothed wheel and a second connection portion connected to the first toothed wheel that extends axially from the first toothed wheel;

said second connection portion of each connection body having a circumferential bulk the radial projection of which is completely contained in a trough of the first toothed wheel.

The second connection portion of each connection body projects axially from a side surface of the first toothed wheel defining a sort of bracket that has the purpose of keeping the first and the second toothed wheel spaced apart.

The Applicant has found that by arranging the second connection portion so that it is within the bulk of a trough, possible dirt and/or small debris that can be deposited on the bracket defined by the second connection portion would be at a roller of the chain.

The roller of the chain is arranged to act as a hinge between two pairs of plates that face one another and are adjacent, allowing each pair of plates to rotate with respect to the adjacent pair of plates.

In this way, the possible accumulation of dirt and/or small debris would tend to bias the roller in the radially outer direction, in other words it would tend to lift the roller.

Such a lifting action of the roller would not compromise the correct engagement of the chain on the toothed wheel, since the roller would simply tend to change the relative inclination between the two pairs of adjacent plates. The insertion space defined between the central portions of each pair of adjacent plates would therefore remain effectively inserted on the tooth of the crown gear, ensuring a correct engagement of the chain on the toothed wheel.

The toothed wheel assembly is arranged to rotate about a rotation axis coinciding with the rotation axis of the rear wheel. Such a rotation axis passes through the center of each sprocket (or toothed wheel) and is the main reference axis for the elements that form part of the present invention; all of the indications of direction and similar, such as "axial", "radial", "circumferential", "diametral" will be made with respect to it; equally, the indications "outwards" and "inwards" referring to radial directions must be interpreted to mean moving away from the axis or towards the axis.

The circumferential bulk of the second connection portion is therefore defined as the distance along a circumferential direction between two circumferentially opposite end surfaces of the second connection portion.

The toothed wheel assembly of the present invention can comprise one or more of the following preferred features, taken individually or in combination.

Preferably, each tooth has a radially outermost portion arranged at a first radial distance from the center of the toothed wheel;

each trough has a radially innermost point arranged at a second radial distance from the center of the toothed wheel and a pair of radially outermost points arranged at a maximum radial distance from the center of the toothed wheel;

said maximum radial distance being equal to the difference between the first radial distance and the second radial distance minus an adjustment factor comprised, including extreme values, between one tenth of the difference between the first radial distance and the second radial distance and half of the difference between the first radial distance and the second radial distance;

each trough being defined between said radially innermost point and said pair of radially outermost points.

The trough between two teeth does not therefore comprise the top portion of the teeth and the relative side edges, and extends from a minimum of 50% up to a maximum of 90% of the total height of the tooth.

Preferably, said second connection portion has a circumferential bulk contained between a pair of points of the trough arranged a radial distance from the radially innermost point of the trough comprised between 10% and 90% of the difference between the maximum radial distance and the second radial distance.

The second connection portion is thus preferably comprised in a portion of the trough that starts from about 10% and goes up to about 90% of the extension in the radial direction of the trough.

Preferably, in the case in which the toothed wheels are perfectly circular, or in any case similar to a circle, the first radial distance, the second radial distance and the maximum radial distance define the radii of respective circumferences.

Preferably, said second connection portion has a circumferential bulk the radial projection of which passes through the radially innermost point of the trough.

In this way, each second connection portion is perfectly centered in a respective trough.

The Applicant has found that in this way the amount of dirt that can accumulate on the second connection portion is limited by the fact that the first toothed wheel does not offer an abutment wall of large size for the accumulation of dirt. The central part of a trough is indeed the radially innermost one, in other words the part that makes a lower abutment wall for the accumulation of dirt (i.e. with shorter radial extension).

Preferably, the circumferential extension of each second connection portion is less than two thirds of the circumferential extension of the respective trough.

Preferably, the circumferential extension of each second connection portion is less than half the circumferential extension of the respective trough.

Preferably, said second connection portion has a radially inner end arranged at a first radial length from the center of the first toothed wheel; said first radial length being equal to or less than a second radial length that a radially inner edge of the first toothed wheel, comprised between said second connection portion and a subsequent second connection portion, is from the center of the first toothed wheel.

In other words, preferably, the radially innermost edge of the second connection portion is either aligned with respect to the radially innermost edge of the first toothed wheel, or is radially more internal than the same edge, at least than the portion of toothed wheel that extends between two consecutive second connection portions.

The Applicant has found that in this way the extension in the radial direction of the first toothed wheel can be minimized, keeping the weight thereof low.

The Applicant has also found that in this way the bracket defined by the second connection portion can be provided the maximum radial distance from the trough, increasing the amount of dirt that must accumulate on the second connection portion before causing any effect on the chain.

Preferably, the inner ends of all of the second connection portions are arranged said first radial length from the center of the first toothed wheel.

In other words, the inner ends of all of the second connection portions are preferably aligned along a circumference.

Preferably, all of the radially inner edges of the first toothed wheel comprised between two adjacent second connection portions are arranged said second radial length from the center of the first toothed wheel.

In other words, the radially inner edges of the first toothed wheel comprised between two adjacent second connection portions are preferably aligned along a circumference.

Preferably, said first radial length is substantially equal to said second radial length.

Preferably, the assembly comprises a radially inner cylindrical portion arranged to engage a freewheel body; a plurality of radial spokes extending from said cylindrical portion and connecting to respective radially inner edges of the first toothed wheel.

The radial spokes have the function of constraining at least the first toothed wheel to the cylindrical portion, so as to keep the toothed wheels centered on the rotation axis of the wheel and spaced from the radially inner cylindrical portion.

Preferably, the radial spokes are substantially rectilinear so as to reduce the amount of material necessary to hold the toothed wheels in position, keeping the total weight of the multiple sprockets low.

Preferably, the radially inner cylindrical portion has an axial extension equal to the axial extension of the toothed wheels of the toothed wheel assembly.

Preferably, said radially inner cylindrical portion comprises an interface surface with said freewheel body from which a plurality of protuberances project, arranged according to a first array and a second array, for engaging respective grooved profiles counter-shaped to said protuberances defined on said freewheel body; said protuberances of said first array and of said second array facing one another in the axial direction.

In this way, the toothed wheel assembly can transfer torque to the freewheel body.

Preferably, said protuberances of said first array and of said second array are axially spaced apart so that there is an empty space between them.

In this way, the total weight of the toothed wheel assembly can be decreased without compromising the shape coupling with the freewheel body. Preferably, the toothed wheel assembly comprises a third toothed wheel having a smaller number of teeth than the number of teeth of the first toothed wheel; said third toothed wheel being connected to the first toothed wheel by respective connection bodies identical to the connection bodies that connect the first toothed wheel to the second toothed wheel.

Alternatively, the third toothed wheel is connected to said radially inner cylindrical portion by said plurality of spokes.

In this way, the torque that can be transferred from the toothed wheels to the radially inner cylindrical portion increases.

Preferably, the toothed wheel assembly comprises further toothed wheels having an increasing number of teeth greater than the number of teeth of the second toothed wheel; said further toothed wheels being connected to one another in series by respective connection bodies identical to the connection bodies that connect the first toothed wheel to the second toothed wheel and wherein the further toothed wheel having a smaller number of teeth is connected to the second toothed wheel by respective connection bodies identical to the connection bodies that connect the first toothed wheel to the second toothed wheel.

Preferably, the toothed wheel assembly comprises further toothed wheels having a decreasing number of teeth less than the number of teeth of the third toothed wheel; said further toothed wheels being connected to one another in series by respective connection bodies identical to the connection bodies that connect the first toothed wheel to the second toothed wheel and wherein the further toothed wheel having a greater number of teeth is connected to the third toothed wheel by respective connection bodies identical to the connection bodies that connect the first toothed wheel to the second toothed wheel.

The number of toothed wheels of the toothed wheel assembly is preferably greater than two and, as a function of the need for a number of gear ratios to be provided, it can reach any number of toothed wheels (for example eleven) compatibly with the space available on the freewheel body. Each toothed wheel has a smaller number of teeth than the teeth of the axially adjacent toothed wheel.

With reference now to the drawing figures, some preferred embodiments of the toothed wheel assembly in accordance with the present solution are shown. Identical reference numerals refer to identical features of each embodiment, the differences between them will be obvious hereinafter.

The toothed wheel assembly is wholly indicated with 10.

The toothed wheel assembly 10 comprises a plurality of toothed wheels 11, 12, 13, or sprockets, of different sizes to one another, arranged parallel to one another and concentric to a rotation axis X.

In the examples illustrated in the attached figures, there are three toothed wheels 11, 12 and 13 and they make up a so-called "triple-set".

In other embodiments that are not illustrated, there can be more than three toothed wheels of the toothed wheel assembly, for example from four to eleven.

In any case, in all of the embodiments, the toothed wheel assembly 10 comprises at least two toothed wheels, in particular a first toothed wheel 12 and a second toothed wheel 13 in which the first toothed wheel 12 has a shorter radial extension than the radial extension of the second toothed wheel 13.

Each toothed wheel 11, 12 and 13 comprises a plurality of teeth 14 separated from one another by a plurality of troughs 15.

The size of each toothed wheel 11, 12 and 13 and in particular the diameter thereof, is determined by the number of teeth 14 thereof. The greater the number of teeth 14, the greater the size of the toothed wheel.

The pitch between the teeth 14, in other words the distance that separates two successive teeth 14, is substantially constant for every toothed wheel and substantially identical in all of the toothed wheels 11, 12 and 13.

The teeth 14 are arranged to receive in engagement the links of a transmission chain (not illustrated). In particular, the teeth 14 are arranged to insert in succession, during the rotation of the sprocket assembly, in insertion spaces delimited axially by pairs of plates of a transmission chain.

As illustrated in FIG. 4, each tooth 14 of any toothed wheel 11, 12 or 13 has a radially outermost end portion 16 arranged a first radial distance D1 from the center C of the toothed wheel.

The center C of the toothed wheel is passed through by the rotation axis X of the toothed wheel assembly 10.

The first radial distances D1 of the teeth 14 of a same toothed wheel are not necessarily identical to one another, since it is possible to foresee some teeth 14 specifically configured to facilitate the engagement of the transmission chain ad having different first radial distances D1 from the remaining teeth 14 of the toothed wheel.

As better illustrated in the enlargement of FIG. 7, each tooth 14, at the radially outermost end portion 16 thereof, has an end profile 17 having an extension in the circumferential direction of size S 1.

The sizes Si are not necessarily all identical to one another.

Each tooth 14 also has respective side edges 17a that degrade, diverging, in the radially inner direction from the end profile 17.

As stated above, two circumferentially adjacent teeth 14 are separated from one another by a trough 15. The distance in the circumferential direction that separates two adjacent teeth 14 is a function of the pitch of the transmission chain and is substantially constant in every toothed wheel 11, 12 and 13 and between different toothed wheels 11, 12 and 13.

Each trough 15 has a substantially arched profile and has a radially innermost point 18 arranged a second radial distance D2 from the center C of the respective toothed wheel 11, 12 and 13.

Every trough 15 also has a pair of radially outermost points 19 (FIG. 7) arranged a maximum radial distance DM from the center C of the toothed wheel 11, 12 and 13.

The extension in the radial direction of every trough 15 is such that the radial distance DM is equal to the difference between the first radial distance D1 and the second radial distance D2 minus an adjustment factor K, in other words DM=(D1−D2)−K.

The first radial distance D1 corresponds to the smaller of the first radial distances D1 of the two adjacent teeth 14 between which the trough 15 extends.

As illustrated in FIG. 7, such a radial extension of the trough 15 corresponds to a circumferential extension thereof given by the distance L that separates the pair of radially outermost points 19 in the circumferential direction.

Every trough 15 is therefore defined by pluralities of pairs of points 20 comprised between the pair of radially outermost points 19 and the radially innermost point 18, as schematized in FIG. 7. The distance in the radial direction that separates the pair of radially outermost points 19 and the radially innermost point 18 is defined as height of the trough 15.

The adjustment factor K is comprised, including extreme values, between one tenth of the difference between the first radial distance D1 and the second radial distance D2 and half of the difference between the first radial distance D1 and the second radial distance D2, in other words:

$$(D1-D2)/10 \leq K \leq (D1-D2)/2$$

Each trough 15 therefore has a maximum height that is comprised between 50% and 90% of the difference between the first D1 and the second D2 radial distance.

In other words, the term trough 15 between two adjacent teeth 14 is meant to indicate the arched profile that extends between the two teeth 14 and that reaches a height greater than 50% and less than 90% of the distance in the radial direction that separates the radially innermost point 18 of the trough 15 from the radially outermost end portion 16 of the tooth 14 having shorter radial extension of the two.

Preferably, the height of the trough 15 reaches 90% of the distance in the radial direction that separates the radially innermost point 18 of the trough 15 from the radially outermost end portion 16 of the tooth 14 having shorter radial extension of the two, in other words the adjustment factor K is equal to (D1−D2)/10.

More preferably, such a height reaches 70% of the distance in the radial direction that separates the radially innermost point 18 of the trough 15 from the radially outermost end portion 16 of the tooth 14 having shorter radial extension of the two, in other words the adjustment factor K is equal to (D1−D2)/7.

Even more preferably, such a height reaches 50% of the distance in the radial direction that separates the radially innermost point 18 of the trough 15 from the radially outermost end portion 16 of the tooth 14 having shorter radial extension of the two, in other words the adjustment factor K is equal to (D1−D2)/5.

The assembly 10 comprises a plurality of connection bodies 30 that mechanically connect the first 12 and the second toothed wheel 13 spacing them apart in the axial direction, as illustrated in FIGS. 1 and 3.

The number of connection bodies 30 is a function of the size of the two toothed wheels connected by them and of the degree of structural rigidity that the assembly 10 must have.

The larger the size of the two toothed wheels, the greater the number of connection bodies 30. The greater the structural rigidity of the assembly 10 must be, the greater the number of connection bodies 30. The maximum limit to the number of connection bodies is equal to the number of troughs 15 present on the smallest toothed wheel among the two toothed wheels connected by the connection bodies 30.

Each connection body 30 comprises a first connection portion 31 connected to the second toothed wheel 13 that extends radially from it towards the first toothed wheel 12.

Figure 10:
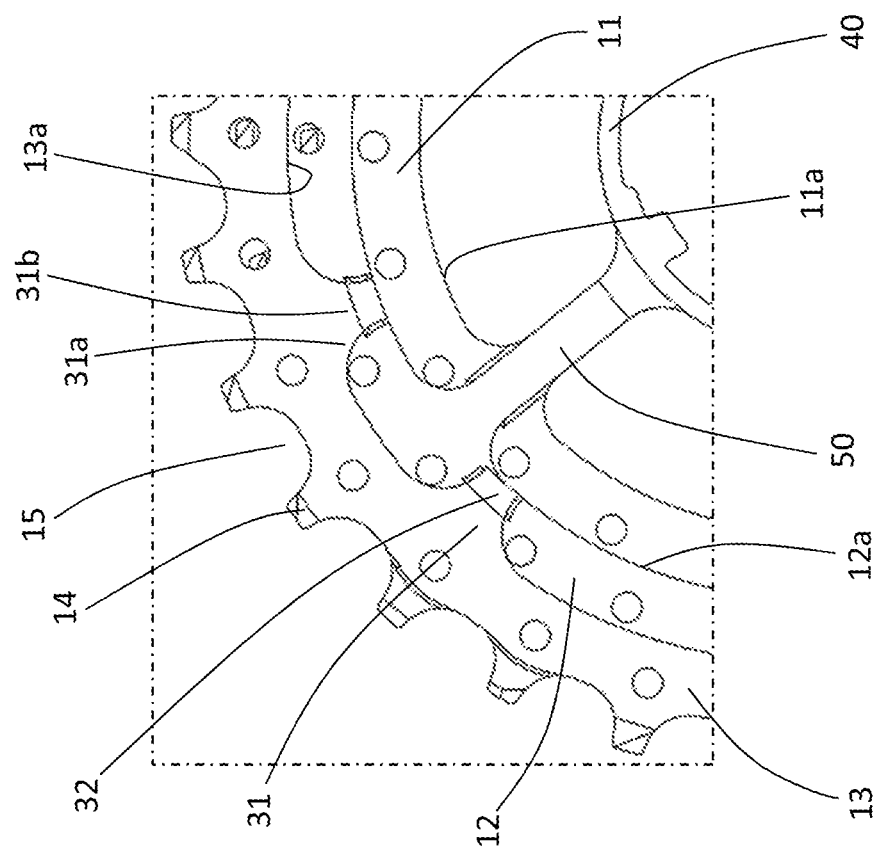
FIG. 10 is an enlargement of some details of the assembly of FIG. 9.

As better illustrated in FIG. 10, the first connection portion 31 extends from a radially inner edge 13a of the second toothed wheel 13 and moves away from it in the radially inner direction.

Figure 9:
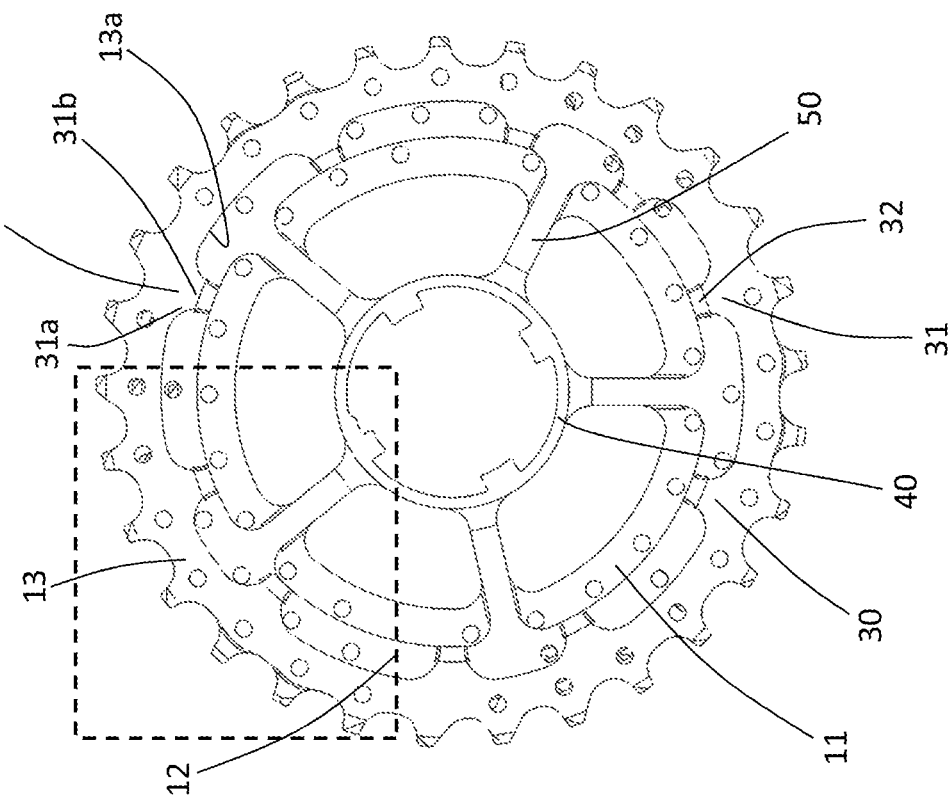
FIG. 9 is a rear view of the assembly of FIG. 1.

The first connection portion 31 has a first area 31a (FIGS. 9 and 10) for joining with the radially inner edge 13a of the second toothed wheel 13. The first joining area 31a has curved surfaces for joining to the radially inner edge 13a of the second toothed wheel 13 without sharp edges.

The first connection portion 31 also has a second area 31b that extends radially inwards from the first area 31a.

In the preferred embodiment of the invention, the second area 31b of the connection portion 31 has a substantially rectilinear radial extension and a substantially constant dimension in the circumferential direction.

The thickness of the first connection portion 31, in other words its dimension in the axial direction is substantially constant.

The thickness of the first connection portion 31 is substantially equal to the thickness of the second toothed wheel 13.

The second toothed wheel 13 is in one piece with, in other words is made together with, the first connection portion 31.

The extension in the radial direction of the first connection portion 31 is a function of the diameters of the first 12 and of the second toothed wheel 13; the less the difference between the two diameters, the shorter the extension in the radial direction of the first connection portion 31.

Each connection body 30 also comprises a second connection portion 32 connected to the first toothed wheel 12 that extends axially from it.

The second connection portion 32 is formed in one piece with the first connection portion 31.

The second connection portion 32 is also formed in one piece with the first toothed wheel 12.

The second connection portion 32 extends in the axial direction by the same amount that axially separates the first 12 and the second toothed wheel 13.

The thickness of the second connection portion 32, in other words its radial dimension, is substantially constant and preferably is identical to the thickness of the first connection portion 31.

Figure 6:
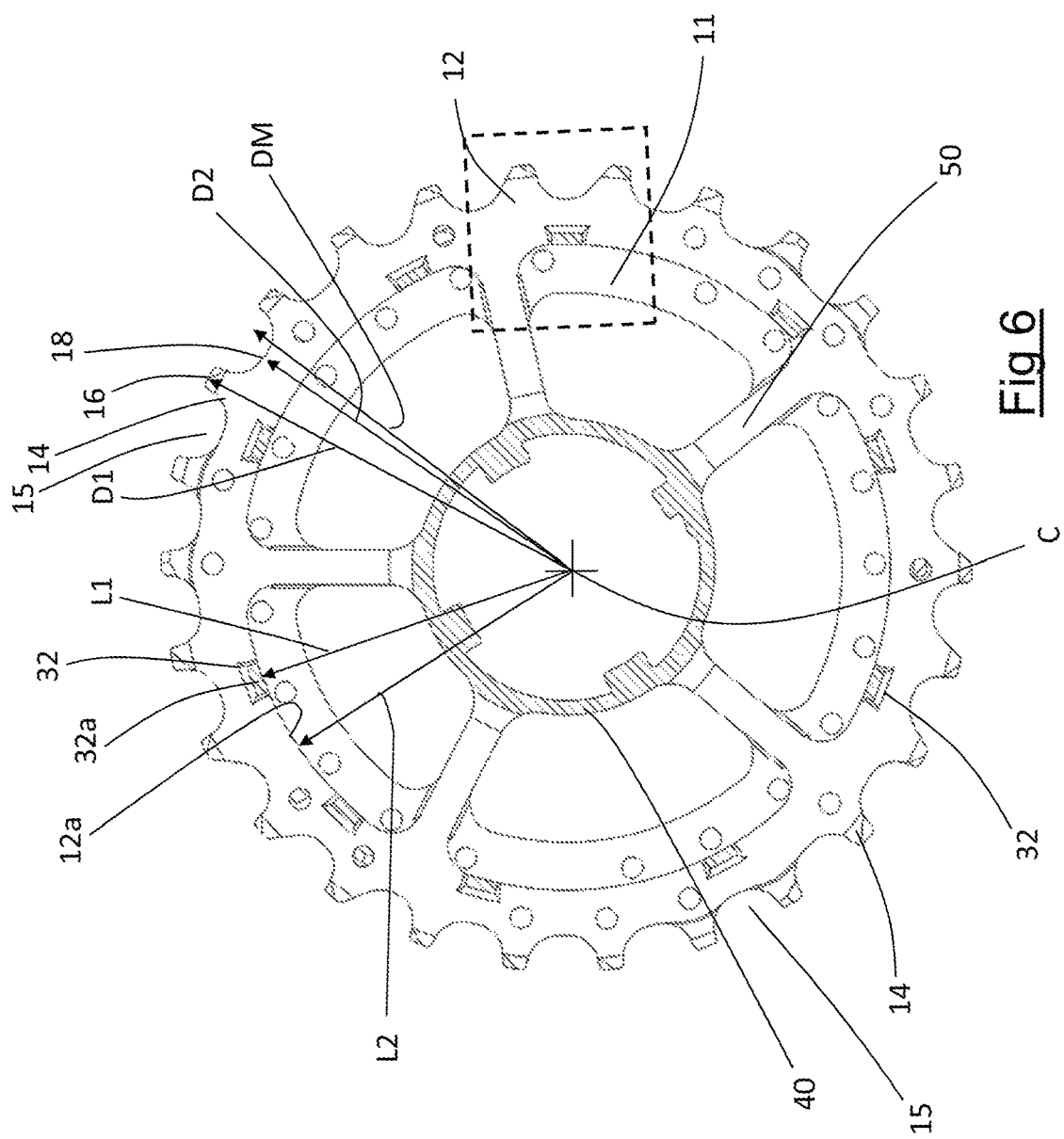
FIG. 6 is a view according to the section plane VI-VI of the assembly of FIG. 5.

As shown in FIG. 6, the second connection portion 32 has a circumferential bulk the radial projection of which is completely contained in a trough 15 of the first toothed wheel 12.

The circumferential bulk of the second connection portion 32 is defined as the distance along a circumferential direction between two radially opposite end surfaces of the second connection portion 32.

The circumferential bulk is thus the projection in the axial direction, or the imprint, on the first toothed wheel 12 of a section 32a of the second connection portion 32 obtained with a section plane perpendicular to the rotation axis X of the assembly 10.

FIG. 8 shows a section 32a of the second connection portion 32 obtained in accordance with the above.

As illustrated in FIG. 8, such a section 32a has a projection in the radial direction that is completely contained in a trough 15 of the first toothed wheel 12, in other words that is contained in the distance L between the pair of radially outermost points 19 of the trough 15.

The circumferential bulk of the second connection portion 32 is such as to contain the second area 31b of the first connection portion 31, in other words the projection in the radial direction outside of the section 32a contains the second area 31b.

Preferably, the second connection portion 32 has a circumferential bulk contained between a pair of points 21, of the plurality of pairs of points 20 that make the trough 15, which are arranged a radial distance D3 from the radially innermost point 18 of the trough (FIG. 8).

The radial distance D3 is comprised between 90% and 10% of the difference between the maximum radial distance DM and the second radial distance D2. In other words, the radial distance D3 is comprised between 10% and 90% of the maximum height reached by the trough 15.

In the example of FIG. 8, the radial distance D3 is about 15% of the maximum height reached by the trough 15 and the height of the trough 15 is about 65% of the difference between the first D1 and the second D2 radial distance.

In any case, the circumferential extension of each second connection portion 32 is less than two thirds of the circumferential extension of the respective trough 15, in other words it is less than two thirds of the distance L between the two radially outermost points 19 of the trough 15.

In the example of FIG. 8, the circumferential extension of each second connection portion 32 is about 55% of the distance L between the two radially outermost points 19 of the trough 15.

In the preferred embodiment of the invention, the projection in the radial direction of the section 32a passes through the radially innermost point 18 of the trough 15, as illustrated for example in FIG. 8.

Preferably, the projection in the radial direction of the section 32a is substantially centered on the radially innermost point 18 of the trough 15.

In other words, the second connection portion 32 is substantially symmetrical with respect to a radial plane that passes through the radially innermost point 18 of the trough 15.

The second connection portion 32 has a radially inner end 33 which is a first radial length L1 from the center C of the first toothed wheel 12, as indicated in FIG. 6. As illustrated in FIG. 1, the radially inner end 33 is arranged at the area in which the second connection portion 32 is connected to the first toothed wheel 12. In other words, the radially inner end 33 emerges from the first toothed wheel 12 and faces towards the center C of the first toothed wheel 12.

The first toothed wheel 12 has a plurality of radially inner edges 12a that extend with continuity between two successive second connection portions 32.

Each radially inner edge 12a is arranged a second radial length L2 from the center C of the first toothed wheel 12.

In the preferred embodiment of the invention, the second radial length L2 is constant for the entire extension of a respective radially inner edge 12a.

In the preferred embodiment of the invention, all of the radially inner edges 12a are arranged the same second radial length L2 from the center of the first toothed wheel 12.

The first radial length L1, in other words the distance that separates the radially inner end 33 of the second connection portions 32 from the center C of the first toothed wheel 12, is equal to or less than the second radial length L2, in other words the distance that separates the radially inner edge 12a from the center C of the first toothed wheel 12.

In other words, the radially inner ends 33 of the second connection portions 32 are aligned or radially more inner with respect to the radially inner edge 12a of the toothed wheel 12.

In the example embodiment illustrated in the attached figures, the radially inner ends 33 of the second connection portions 32 are aligned with the radially inner edges 12a of the first toothed wheel 12, as for example illustrated in FIGS. 1 and 6.

The first toothed wheel 12 is connected to a radially inner cylindrical portion 40 which is arranged to engage a freewheel body (not illustrated) of the hub of the rear wheel of the bicycle.

The radially inner cylindrical portion 40 comprises an interface surface 41 with the freewheel body from which a plurality of protuberances 42 project.

The protuberances 42 are intended to engage respective grooved profiles (not illustrated) counter-shaped to the protuberances 42 and arranged on the freewheel body to make a shape coupling capable of transmitting torque between the freewheel body and the radially inner cylindrical portion 40 and vice-versa.

Figure 2:
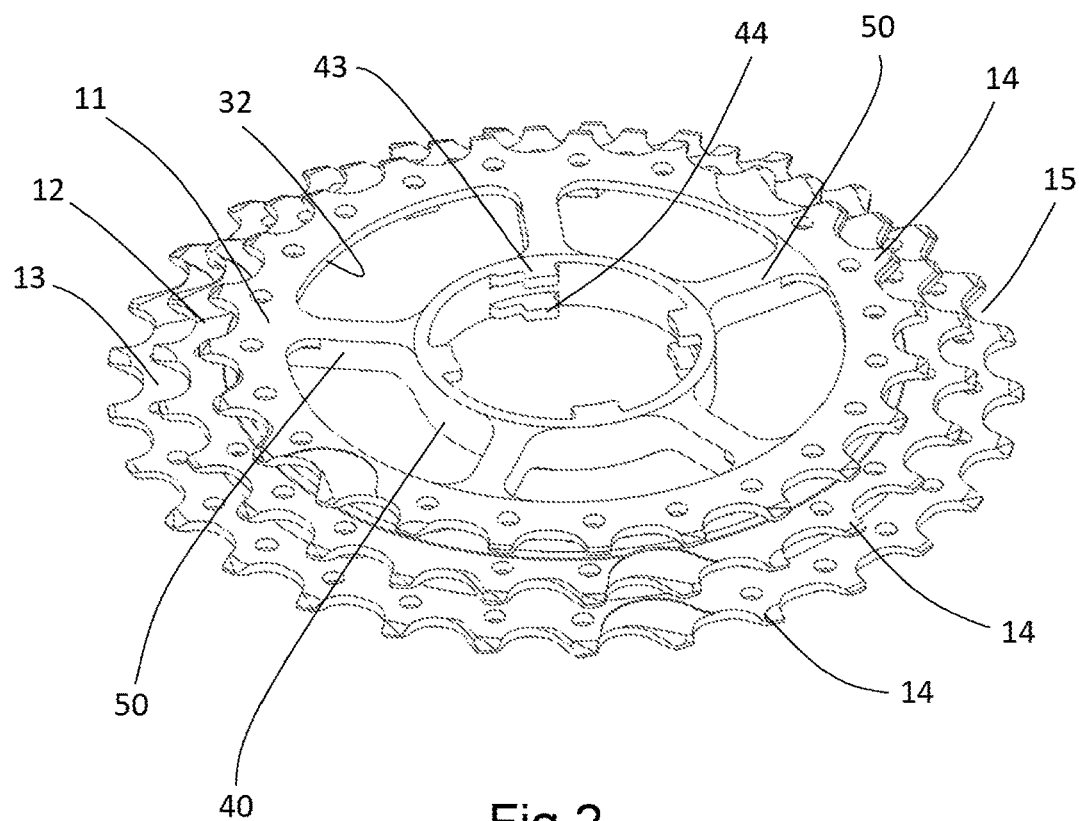
FIG. 2 is a further perspective view of the assembly of FIG. 1.
Figure 5:
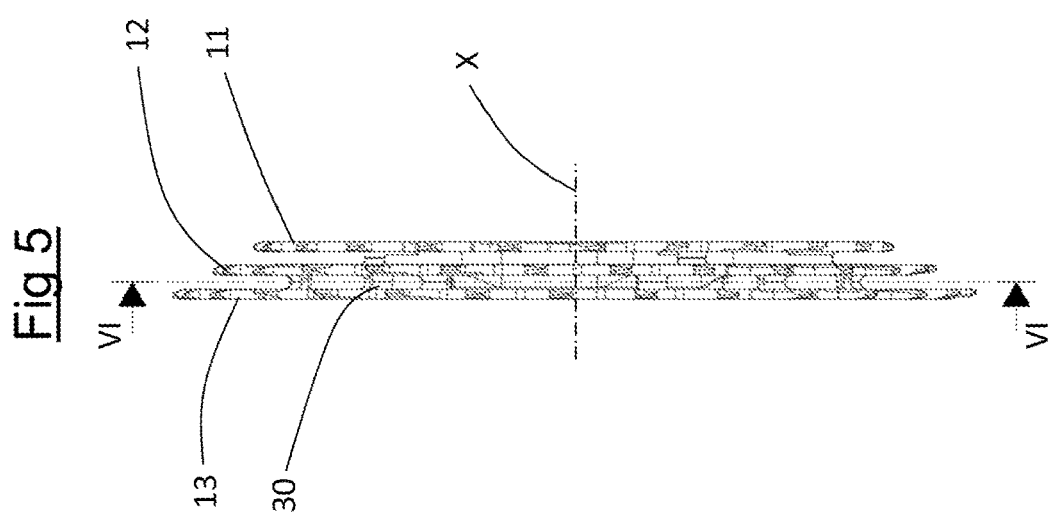
FIG. 5 is a side view of the assembly of FIG. 2.

As shown in FIGS. 1, 2 and 3, the protuberances 42 are arranged according to a first array 43 and a second array 44 of protuberances 42.

The protuberances 42 of the first array 43 and of the second array 44 are aligned in the axial direction, in other words they face one another in the axial direction.

The axially aligned protuberances 42 have the same profile so s to be substantially identical.

Two mutually facing protuberances 42 are axially spaced apart so that there is an empty space between them.

Preferably, as illustrated in FIG. 2, the protuberances 42 of one same array are not all identical to one another. At least one of the protuberances 42 of one same array has a different outer profile from that of the remaining protuberances 42, so as to ensure a single angular mounting position of the radially inner cylindrical portion 40 on the freewheel body.

The mechanical coupling between the radially inner cylindrical portion 40 and the first toothed wheel 12 is obtained by a plurality of radial spokes 50 that extend from the cylindrical portion 40 and reach respective radially inner edges 12a of the first toothed wheel 12 (see, for example, FIGS. 1 and 3).

The radial spokes 50 have a rectilinear extension and a length in the radial direction such as to allow the correct radial positioning of the teeth of the first toothed wheel 12.

The radial spokes 50 are made in one piece with the first toothed wheel 12 and with the radially inner cylindrical portion 40.

The thickness in the axial direction of the radial spokes 50 is such that close to the radially inner edges 12a of the first toothed wheel 12 the spoke has a thickness equal to the thickness, in the same direction, of the first toothed wheel 12, as illustrated in the example of FIG. 3.

The assembly 10 can comprise a third toothed wheel 11, like in the example embodiments of the attached figures.

The third toothed wheel has a smaller number of teeth 14 than the number of teeth 14 of the first toothed wheel 12 and has a smaller diameter with respect to that of the first toothed wheel 12.

In the example of FIGS. 3 and 4, the third toothed wheel 11 is connected to the first toothed wheel 12 by connection bodies 30 identical to those described earlier.

In particular, the first connection portion 31 extends radially away from the first toothed wheel 12 and the second connection portion 32 is connected to the third toothed wheel 11 and extends axially, away from it, as shown in FIG. 3.

Alternatively, as shown in the example of FIGS. 1 and 2, the third toothed wheel 11 is also connected to the radially inner cylindrical portion 40 by the radial spokes 50.

In particular, the radial spokes 50 are also connected to a radially inner edge 11a of the third toothed wheel 11.

The radial spokes 50 have an axial thickness at the radially inner edge 11a of the third toothed wheel 11 substantially equal to the sum of the axial distance that separates the third toothed wheel 11 from the first 12, of the axial thickness of the third toothed wheel 11 and of the axial thickness of the first toothed wheel 12.

The radial spokes 50 thus take care of spacing apart in the axial direction the third 11 and the first toothed wheel 12.

In this example embodiment, the third toothed wheel 11 is not connected to the second toothed wheel 13 by the connection bodies 30.

In embodiments that are not illustrated, the assembly 10 can comprise further toothed wheels connected to the third toothed wheel 11 (in the case in which the further toothed wheels have smaller and decreasing diameters with respect to the diameter of the third toothed wheel 11) or to the second toothed wheel 13 (in the case in which the further toothed wheels have greater and increasing diameters with respect to the diameter of the second toothed wheel 13).

In the case in which there is a further toothed wheel of smaller diameter than the third toothed wheel 11, such a further toothed wheel is connected to the third toothed wheel by connection bodies 30 identical to those that connect the first 12 and the second toothed wheel 13.

In the case in which there is a further toothed wheel of greater diameter than the second toothed wheel 13, such a further toothed wheel is connected to the second toothed wheel by connection bodies 30 identical to those that connect the second 13 and the first toothed wheel 12.

Moreover, each further toothed wheel is connected to the further toothed wheel of immediately smaller or immediately larger size by connection bodies 30 identical to those that connect the second 13 and the first toothed wheel 12 . . . . Of course, those skilled in the art can bring numerous modifications and variants to the invention described above, in order to satisfy specific and contingent requirements, like for example foreseeing assemblies 10 having any number of toothed wheels, all in any case encompassed by the scope of protection of the present invention as defined by the following claims.

What is claimed is:

1. A toothed wheel assembly for a bicycle sprocket assembly comprising:
    at least one first and a second toothed wheel;
    each toothed wheel comprising a plurality of teeth separated from one another by corresponding troughs and wherein the second toothed wheel has a greater number of teeth than a number of teeth of the first toothed wheel;
    plurality of connection bodies that mechanically connect the first toothed wheel and the second toothed wheel axially spacing them apart, each connection body comprising a first connection portion connected to the second toothed wheel which extends radially from the second toothed wheel towards the first toothed wheel and a second connection portion connected to the first toothed wheel that extends axially from the first toothed wheel;
    said second connection portion of each connection body having a circumferential radial projection which is completely contained in each corresponding trough of the first toothed wheel; and,
    a radially inner cylindrical portion that has an inside dimension and an larger outside dimension wherein the inside dimension has a plurality of protuberances dimensioned to complement a bicycle rear wheel hub and the outside dimension has a plurality of radial spokes that are integral with at least one of the first toothed wheel and the second toothed wheel.

2. The toothed wheel assembly according to claim 1, wherein: each tooth of the first toothed wheel and the second toothed wheel has a corresponding radially outermost portion arranged at a corresponding first radial distance from a center of the radially inner cylindrical portion;
 each trough of the first toothed wheel and the second toothed wheel has a corresponding radially innermost point arranged at a corresponding second radial distance from the center of the radially inner cylindrical portion, and a corresponding pair of radially outermost points arranged at a corresponding maximum radial distance from the center of the radially inner cylindrical portion;
 said maximum radial distance being equal to a difference between the first radial distance and the second radial distance minus adjustment factor that is between one tenth of the difference between the first radial distance and the second radial distance and half of the difference between the first radial distance and the second radial distance;
 each trough of the first toothed wheel and the second toothed wheel being defined between the corresponding radially innermost point and the corresponding pair of radially outermost points.

3. The toothed wheel assembly according to claim 2, wherein said second connection portion of each connection body has a circumferential bulk contained between a pair of trough points that are arranged a third radial distance from the radially innermost point of each trough on the first toothed wheel that is between 10% and 90% of the difference between the maximum radial distance and the second radial distance.

4. The toothed wheel assembly according to claim 3, wherein said second connection portion has a circumferential radial projection which passes through the radially innermost point of each trough on the first toothed wheel.

5. The toothed wheel assembly according to claim 3, wherein said second connection portion has a radially inner end arranged at a first radial length from a center of the first toothed wheel; said first radial length being equal to or less than a second radial length that a radially inner edge of the first toothed wheel, comprised between said second connection portion and a subsequent second connection portion, is from the center of the first toothed wheel.

6. The toothed wheel assembly according to claim 2, wherein said second connection portion has the circumferential radial projection which passes through the radially innermost point of each trough on the first toothed wheel.

7. The toothed wheel assembly according to claim 6, wherein said second connection portion has a radially inner end arranged at a first radial length from a center of the first toothed wheel; said first radial length being equal to or less than a second radial length that a radially inner edge of the first toothed wheel, comprised between said second connection portion and a subsequent second connection portion, is from the center of the first toothed wheel.

8. The toothed wheel assembly according to claim 2, wherein said second connection portion has a radially inner end arranged at a first radial length from a center of the first toothed wheel; said first radial length being equal to or less than a second radial length that a radially inner edge of the first toothed wheel, comprised between said second connection portion and a subsequent second connection portion, is from the center of the first toothed wheel.

9. The toothed wheel assembly according to claim 1, wherein said second connection portion has a radially inner end arranged at a first radial length from a center of the first toothed wheel; said first radial length being equal to or less than a second radial length that a radially inner edge of the first toothed wheel, comprised between said second connection portion and a subsequent second connection portion, is from the center of the first toothed wheel.

10. The toothed wheel assembly according to claim 9, wherein the radially inner ends of all of the second connection portions are arranged at said first radial length from the center of the first toothed wheel.

11. The toothed wheel assembly according to claim 10, wherein said first radial length is substantially equal to said second radial length.

12. The toothed wheel assembly according to claim 10, wherein all of the radially inner edges of the first toothed wheel comprised between two adjacent second connection portions are arranged at said second radial length from the center of the first toothed wheel.

13. The toothed wheel assembly according to claim 9, wherein all of the radially inner edges of the first toothed wheel comprised between two adjacent second connection portions are arranged at said second radial length from the center of the first toothed wheel.

14. The toothed wheel assembly according to claim 1, wherein said plurality of protuberances of said radially inner cylindrical portion are arranged according to a first array and a second array, and said plurality of protuberances of said first array and said second array are facing one another in an axial direction.

15. The toothed wheel assembly according to claim 14, wherein said plurality of protuberances of said first array and said second array are axially arranged so that there is space between them.

16. The toothed wheel assembly according to claim 1, further comprising a third toothed wheel having a smaller number of teeth than the number of teeth of the first toothed wheel; said third toothed wheel being connected to the first toothed wheel by respective connection bodies identical to said plurality of connection bodies that connect the first toothed wheel to the second toothed wheel.

17. The toothed wheel assembly according to claim 1, further comprising a third toothed wheel having a smaller number of teeth than the number of teeth of the first toothed wheel; said third toothed wheel being connected to said radially inner cylindrical portion by said plurality of radial spokes.

* * * * *